United States Patent [19]
Fukumoto et al.

[11] Patent Number: 5,825,594
[45] Date of Patent: Oct. 20, 1998

[54] MAGNETO-RESISTANCE EFFECT-TYPE MAGNETIC HEAD

[75] Inventors: Koji Fukumoto, Miyagi; Yutaka Soda, Kanagawa; Norio Saito; Takuji Shibata, both of Miyagi, all of Japan

[73] Assignee: Sony Corporation, Tokyo, Japan

[21] Appl. No.: 744,639

[22] Filed: Nov. 6, 1996

[30] Foreign Application Priority Data

Nov. 7, 1995 [JP] Japan .................................... 7-288397

[51] Int. Cl.$^6$ ........................................................ G11B 5/39
[52] U.S. Cl. ............................................................ 360/113
[58] Field of Search ............................. 360/113; 324/252; 338/42 R

[56] References Cited

U.S. PATENT DOCUMENTS 5,132,859  7/1992  Andricacos et al. ..................... 360/113

*Primary Examiner*—Robert S. Tupper
*Attorney, Agent, or Firm*—Hill & Simpson

[57] ABSTRACT

A magneto-resistance effect-type magnetic head according to the present invention can generate a high reproduction output by increasing a quantity of magnetic flux passing across an effective magneto-sensitive zone of a magneto-resistance effect element, while maintaining its inherent functions as a means for preventing unnecessary magnetic flux from entering the MR element or as a recording pole. The magneto-resistance effect-type magnetic head for reproducing signals from a magnetic recording medium, includes a magneto-resistance effect element, upper and lower magnetic layers between which the magneto-resistance effect element is interposed, and a low-permeability magnetic layer provided on at least one of surfaces of the upper and lower magnetic layers which surfaces are opposed to the magneto-resistance effect element, the low-permeability magnetic layer having a magnetic permeability not more than half of a magnetic permeability of the upper or lower magnetic layer.

6 Claims, 2 Drawing Sheets

MAGNETO-RESISTANCE EFFECT-TYPE MAGNETIC HEAD

BACKGROUND OF THE INVENTION

1. Field of the Invention

The present invention relates to a magneto-resistance effect-type magnetic head, and more particularly to a magneto-resistance effect-type magnetic head having a specific structure in which a magneto-resistance effect-type element, which can exhibit such a magneto-resistance effect that a resistivity thereof is caused to change according to an intensity of magnetic field exerted by a magnetic recording medium, is interposed between upper and lower magnetic layers.

2. Prior Art

In association with a recent tendency that miniaturization of hard disc apparatuses having a large storage capacity is continuously sought, especially in the application fields of portable computers such as typically note-type personal computers, there is a demand for producing a further miniaturized hard disc apparatuses, for example, having a size on the order of 2.5 inches.

In these small-size hard disc apparatuses, a traveling velocity of a recording medium decreases depending upon a diameter of a hard disc used therein. Consequently, in the case where it is intended to reduce a size of conventional induction-type magnetic heads, a reproduction output therefrom is deteriorated because the reproduction output is in proportion to the traveling velocity of the recording medium. This results in disturbing the production of hard disc apparatuses having both a small size and a large storage capacity.

On the other hand, in order to realize a small-size hard disc apparatuses having a large storage capacity, particular attention has been paid to a magneto-resistance effect-type magnetic head (hereinafter referred to merely as "MR head") which outputs a reproduction output voltage by detecting change in magnetic resistance of a magnetic layer (hereinafter referred to merely as "MR element"), because the reproduction output is not influenced by the traveling velocity of the recording medium and therefore a high reproduction output can be attained even at a low traveling velocity of the recording medium.

Such an MR head is a reproducing magnetic head utilizing a so-called magneto-resistance effect that an electrical resistance thereof is changed depending upon the angle made between the direction of magnetization of the transition metal used and the direction of a current flowing therethrough. That is, when the MR head receives a leakage flux from the magnetic recording medium, reversal of the direction of magnetization of the MR element is caused so that the angle made between the direction of magnetization of the MR element and the direction of the electrical current flowing through the MR element is varied depending upon a quantity of magnetism thereof. This causes change in the electrical resistance of the MR element, so that change in voltage, which is proportional to the change in the electrical resistance, appears on electrodes formed on opposite ends of the MR element. Accordingly, magnetic recording signal stored on the magnetic recording medium can be read out by detecting the change in voltage.

The MR head can be produced by laminating an MR film, an electrode film, an insulating film or the like on a substrate according to vacuum thin film-forming techniques and then etching these laminated films into a desired shape according to a photo-lithographic method. Such an MR head has a magnetically-shielding structure in which an MR element is interposed between upper and lower magnetic layers composed of a magnetically shielding material so as to determine a length of gap required upon reproduction and prevent undesired magnetic flux from entering the MR element.

Specifically, for example, in the case of a so-called vertical-type MR head in which a sense current flows in the direction perpendicular to the direction of traveling of the magnetic recording medium, as shown in FIG. 1, a lower magnetic layer 102 composed of a soft magnetic film and an insulating layer 105 composed of $Al_2O_3$ or $SiO_2$ are in turn laminated on a non-magnetic substrate 104 composed of a ceramic material or a glass material. An MR element 101 is disposed on the insulating layer 105 such that a longitudinal direction of the MR element is perpendicular to one surface of the MR head opposed to a magnetic recording medium 111, i.e., a slide contact surface (a) of the MR head which is brought into slide contact with the magnetic recording medium 111, and one end face of the MR element exposed to the slide contact surface (a) of the MR head. In addition, front and rear electrodes 106a and 106b are connected to opposite ends of the MR element 101 to supply the sense current to the MR element 101. Further, an insulating layer 107 composed of $Al_2O_3$ or $SiO_2$ is formed on a surface of the MR element 101. A bias conductor 108 is disposed on the insulating layer 107 in an opposed relation to the surface of the MR element 101. Laminated over the bias conductor 108 are in turn an insulating layer 109 and an upper magnetic layer 103 composed of a soft magnetic film. Furthermore, a protective layer 110 composed of a non-magnetic and non-conductive material is formed on the upper magnetic layer 103 to thereby complete the afore-mentioned MR head. The thus-constructed MR head has a region (d) acting as an effective magneto-sensitive zone located between portions where the front electrode 106a an the rear electrode 106b are attached to the MR element 101.

In addition to the afore-mentioned vertical-type MR head, a so-called lateral-type MR head, in which a sense current flows in the direction parallel with the direction of a track width of the magnetic recording medium, has been also utilized. The lateral-type MR head has such a structure that a longitudinal direction of the MR element is parallel to the slide contact surface (a) of the MR head which is brought into slide contact with the magnetic recording medium 111.

Next, functions of the MR element incorporated in the MR head are explained. An electrical resistance R of the MR element is varied according to a density of a magnetic flux (quantity of the magnetic flux) passing across the MR element. Specifically, a dependency of the electrical resistance of the MR element relative to an external magnetic field is represented by a characteristic curve as shown in FIG. 2.

When the MR element is operated, the MR element is first preliminarily supplied with a bias magnetic field Hb so as to exhibit an excellent linearity relative to the external magnetic field and give a largest change in the electrical resistance R. It is assumed that the point satisfying the afore-mentioned requirements is given by an operating point P. Under such a condition, when a signal magnetic field $\Delta H_S$ is input from the magnetic recording medium into the MR element, it is converted into the change $\Delta R_S$ in the electrical resistance of the MR element. That is, in the case where a given intensity $I_S$ of the sense current is preliminarily caused to flow through the MR element, the change $\Delta R_S$ in the electrical resistance of the MR element can be picked up in the form of an output voltage $\Delta V_S$ according to Ohm's law. In this case, the output voltage is given by the equation of $\Delta V_S = \Delta R_S \times I_S$.

As described above, since the afore-mentioned MR head has such a structure that the MR element is interposed between the upper and lower magnetic layers, an enhanced resolution, an improved S/N ratio of the reproduction output and a high recording density can be obtained as compared to MR heads having no upper and lower magnetic layers.

In consequence, it is considered that these vertical-type MR heads will be predominately used henceforth, because they exhibit excellent off-track characteristics as compared with the lateral-type MR heads. However, since the effective magneto-sensitive zone of the vertical-type MR head is located at a position spaced inwardly apart from the gap depth, the signal magnetic field is difficult to reach the effective magneto-sensitive zone. This results in occurrence of difficulty in increasing the reproduction output thereof. The difficulty causes a large disturbance against improving a performance of the vertical-type MR heads.

Conventionally, many attempts have been made in order to eliminate these problems. For example, in order to prevent deterioration in the reproduction output form the vertical-type MR heads, there have been conventionally proposed a method in which the MR heads is machined to render the gap depth as narrow as possible, a method in which configurations of the upper and lower magnetic layers are optimized, or the like.

However, recently, it has been required that the vertical-type MR elements are miniaturized to a size on the order of below $\mu$m. Accordingly, ordinary mechanical machining is not effective to optimize the configurations of the upper and lower magnetic layers. Thus, the shortening of the gap depth and the optimization of the upper and lower magnetic layers cannot be achieved to a sufficient extent.

SUMMARY OF THE INVENTION

The present invention has been made in view of the aforementioned problems encountered in conventional MR heads.

It is therefore an object of the present invention to provide a magneto-resistance effect-type magnetic head (MR head) capable of increasing a quantity of magnetic flux passing across an effective magneto-sensitive zone of a magneto-resistance effect element (MR element) to generate a high reproduction output while maintaining its inherent functions as a means for preventing unnecessary magnetic flux from entering the MR element or as a recording pole.

In an aspect of the present invention, there is provided a magneto-resistance effect-type magnetic head for reproducing signals from a magnetic recording medium, which includes a magneto-resistance effect element, upper and lower magnetic layers between which the magneto-resistance effect element is interposed, and a low-permeability magnetic layer provided on at least one of surfaces of the upper and lower magnetic layers which surfaces are opposed to the magneto-resistance effect element, the low-permeability magnetic layer having a magnetic permeability not more than half of a magnetic permeability of said upper or lower magnetic layer.

Thus, the magneto-resistance effect-type magnetic head (MR head) according to the present invention is provided therein with a magneto-resistance effect element (MR element) capable of exhibiting such a magneto-resistance effect that an electrical resistance thereof is changed according to a magnetic field applied thereto. The MR head can generate a reproduction output voltage by detecting the change in electrical resistance of the MR element. The MR element is provided on opposite ends thereof with a pair of electrodes, so that an effective magneto-sensitive zone is formed on a surface of the MR element between the pair of electrodes. Further, the MR element and the pair of electrodes are interposed between the upper and lower magnetic layers.

The present invention aims at the production of the magneto-resistance effect-type magnetic head of a so-called vertical-type in which a longitudinal direction of the MR element is approximately perpendicular to the direction of traveling of the magnetic recording medium, i.e., a sense current applied to the MR element flows in the direction approximately perpendicular to the direction of traveling of the magnetic recording medium.

The MR head according to the present invention includes a low-permeability magnetic layer provided on at least one of the surfaces of the upper and lower magnetic layers which surfaces are opposed to the MR element, and having a magnetic permeability not more than half of a magnetic permeability of the upper or lower magnetic layer.

In this case, it is specifically preferred that the low-permeability magnetic layer is disposed only in close proximity to the surface of the MR head along which the magnetic recording medium is slidingly traveled, in order to limit the change in bias magnetic field applied to the effective magneto-sensitive zone of the MR element to a low level and facilitate the production of the MR head.

As described above, the MR head according to the present invention has such a structure that one or two low-permeability magnetic layers are provided on either surface or both surfaces of the lower and upper magnetic layers which surfaces are opposed to the MR element. Accordingly, a magnetic flux to be absorbed by the lower and/or upper magnetic layers is passed through the low-permeability magnetic layer before reaching the lower and/or upper magnetic layers. As a result, the quantity of the magnetic flux reaching the lower and/or upper magnetic layers is reduced as compared to the conventional MR heads without the low-permeability magnetic layer. In addition, since the magnetic permeability of the low-permeability magnetic layer is adjusted to a level not more than half of the magnetic permeability of the lower and/or upper magnetic layers, it is prevented that inherent functions of the lower and/or upper magnetic layers, i.e., a function for preventing unnecessary magnetic flux from entering the MR element or a function as a recording pole, are deteriorated.

Thus, the MR head according to the present invention can satisfy two contradictory requirements simultaneously, i.e., not only the quantity of the magnetic flux to be absorbed into the lower and/or upper magnetic layers can be reduced so that a magnetic flux-converging efficiency of the MR element is enhanced and the reproduction output from the MR head is increased, but also the afore-mentioned inherent functions of the lower and/or upper magnetic layers can be maintained.

These an other objects, features and advantages of the present invention will become more apparent from the following detailed description when read in conjunction with the accompanying drawings and the appended claims.

DETAILED DESCRIPTION OF PREFERRED EMBODIMENT

Preferred embodiments of the present invention are described in more detail below by referring to the accompanying drawings.

Figure 1:
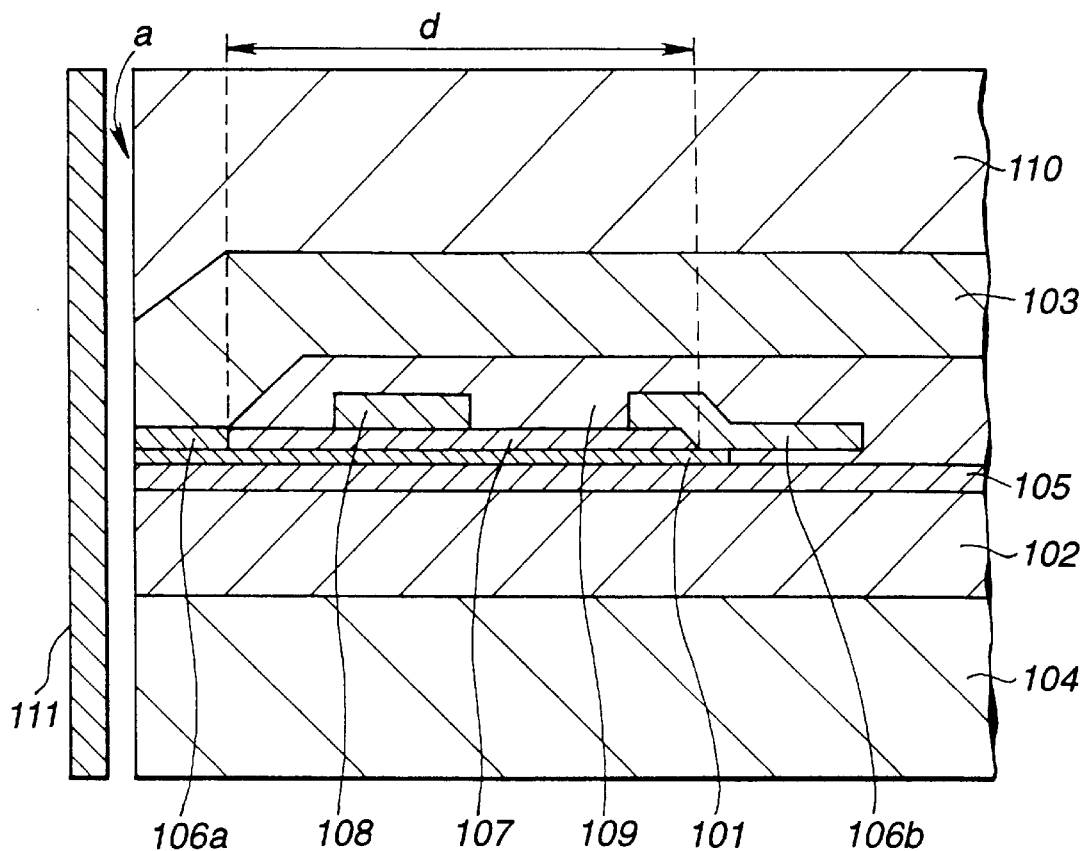
FIG. 1 is a vertical cross-sectional view schematically showing a conventional magneto-resistance effect-type magnetic head.
Figure 2:
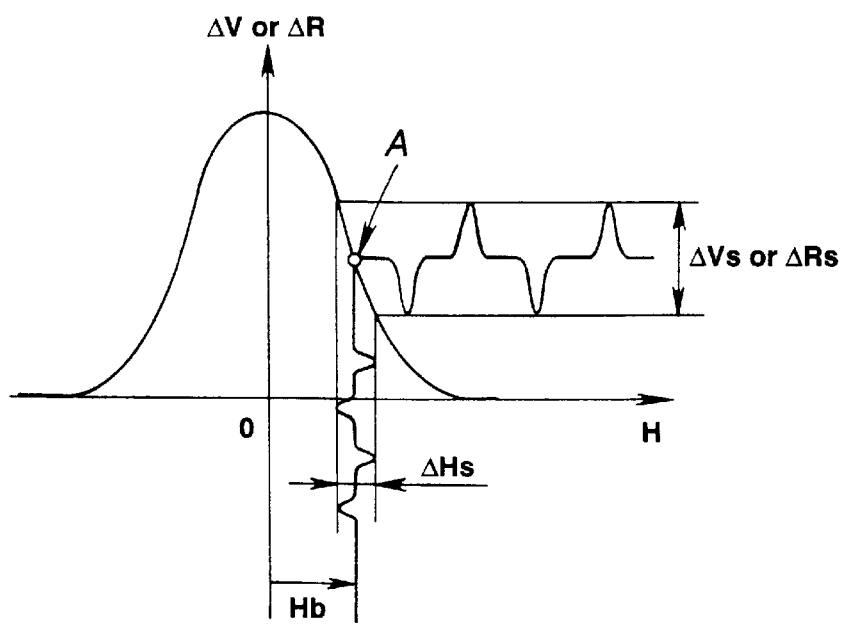
FIG. 2 is a characteristic curve showing a relationship between a signal magnetic field applied to a magneto-resistance effect element of the head and change in an electrical resistance of the magneto-resistance effect element.
Figure 3:
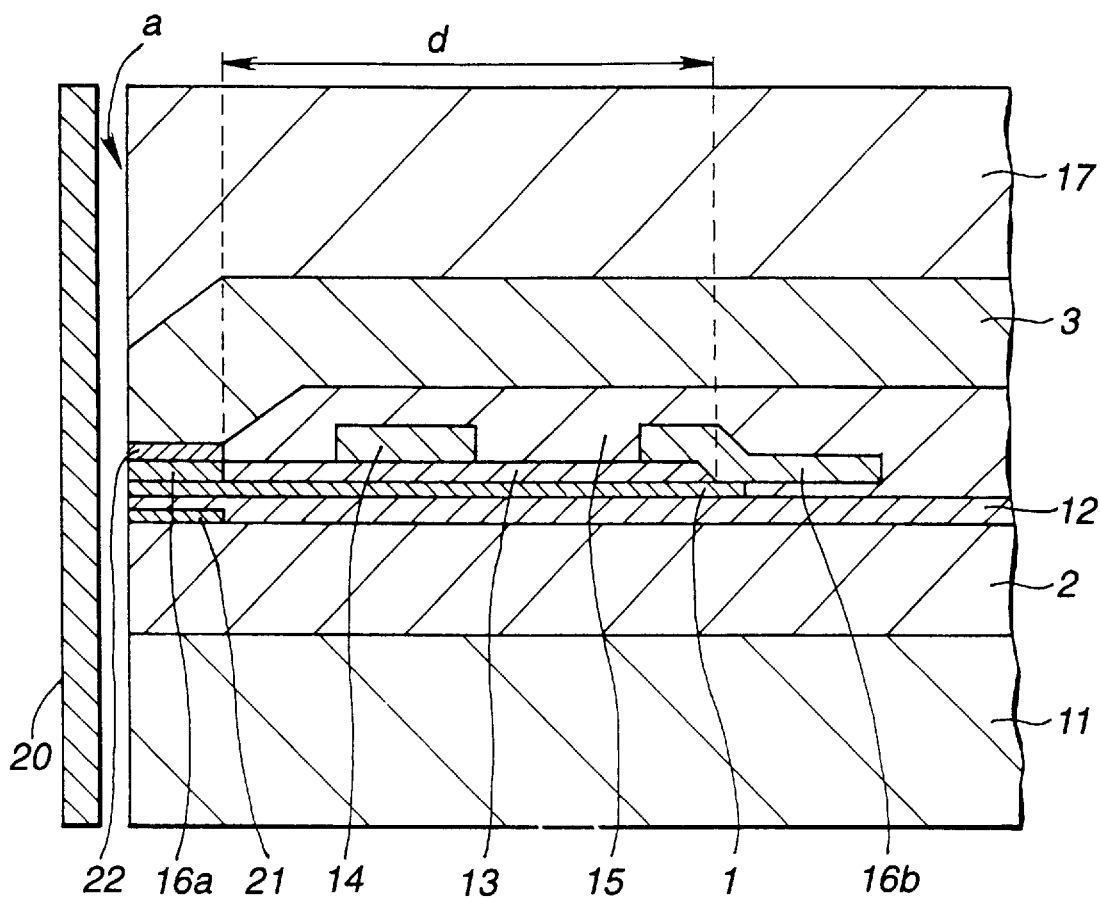
FIG. 3 is a vertical cross-sectional view schematically showing a magneto-resistance effect-type magnetic head according to the present invention.

As shown in FIG. 3, the magneto-resistance effect-type magnetic head (MR head) according to the present invention can be a so-called vertical-type thin film magnetic head. The MR head has such a structure that a magneto-resistance effect element (MR element) 1 is so arranged that a longitudinal direction thereof is approximately perpendicular to a surface (a) of the MR head along which a magnetic recording medium 20 is slidingly traveled. The MR element 1 is interposed between a lower magnetic layer 2 and an upper magnetic layer 3.

Specifically, the lower magnetic layer 2 serving as a magnetically-shielding film and composed of Ni—Fe or the like is formed on a non-magnetic substrate 11 composed of a ceramic material, a glass material or the like. It is preferred that the lower magnetic layer 2 is prepared from permalloy having a composition of $Fe_{20}Ni_{80}$ and a relative magnetic permeability of about 2,000. An insulating layer 12 composed of silicon dioxide ($SiO_2$) is laminated over the lower magnetic layer 2.

Further, the MR element 1 is formed on the insulating layer 12. Another insulating layer 13 composed of $SiO_2$ or the like is formed on the MR element. Thus, in the MR head according to the preferred embodiment of the present invention, the MR element 1 is disposed such that the longitudinal direction thereof is approximately perpendicular to its surface opposed to the magnetic recording medium 20, i.e., the surface (a) of the MR head along which the magnetic recording medium 20 is slidingly traveled. One end face of the MR element 1 is exposed to the surface (a) of the MR head.

Formed on the insulating layer 13 is a bias conductor 14 which applies a given bias magnetic field to the MR element 1. A further insulating layer 15 is formed on the bias conductor 14 such that the bias conductor 14 is embedded within the insulating layer 15.

A front electrode 16a and a rear electrode 16b both composed of a conductive film are provided on opposite ends of the MR element 1, namely at its one end located on a side of the surface (a) of the head along which the magnetic recording medium is slidingly traveled, and the other end spaced by a predetermined distance apart from the one end. These front and rear electrodes 16a and 16b supplies to the MR element 1 a sense current which flows in the longitudinal direction of the MR element, i.e., in the direction perpendicular to the surface (a) of the head along which the magnetic recording medium 20 is slidingly traveled. In other words, the front and rear electrodes 16a and 16b are so disposed as to interpose the MR element 1 therebetween. A region (d) of the MR element 1 between the portions where the front and rear electrodes 16a and 16b are attached to the MR element 1, provides an effective magneto-sensitive zone which can exhibit a magneto-resistance effect. Further, a distance between the surface (a) of the MR head along which the magnetic recording medium is slidingly traveled and the effective magneto-sensitive zone (d), corresponds to a gap depth. Similarly to the bias conductor 14, the front and rear electrodes 16a and 16b are embedded within the insulating layer 15.

On the insulating layer 15, there is formed an upper magnetic layer 3 which is composed of Ni—Fe or the like such that the MR element 1 is interposed between the upper and lower magnetic layers 2 and 3. Similarly to the lower magnetic layer 2, it is preferred that the upper magnetic layer 3 is prepared from permalloy having a composition of $Fe_{20}Ni_{80}$ and a relative magnetic permeability of about 2,000.

In the MR head according to the preferred embodiment of the present invention, low-permeability magnetic layers 21 and 22 composed of Ni—Fe or the like are formed on surfaces of the lower and upper magnetic layers 2 and 3, respectively, which surfaces are opposed to the MR element 1. The low-permeability magnetic layers 21 and 22 are disposed in close proximity to the surface (a) of the MR head along which the magnetic recording medium is slidingly traveled. These low-permeability magnetic layers 21 and 22 have a magnetic permeability not more than half of the magnetic permeability of the lower magnetic layer 2 or the upper magnetic layer 3. More specifically, the lower low-permeability magnetic layer 21 is interposed between the lower magnetic layer 2 and the insulating layer 12 while the upper low-permeability magnetic layer 22 is interposed between the upper magnetic layer 3 and the front electrode 16a. Preferably, the low-permeability magnetic layers 21 and 22 each have a length approximately identical to the gap depth, for example, 0.5 $\mu$m. Further, it is preferred that the low-permeability magnetic layers 21 and 22 each have a thickness not more than the reproduction gap length, for example, not more than 0.2 $\mu$m. Similarly, the low-permeability magnetic layers 21 and 22 are each composed of permalloy having a composition of $Fe_{25}Ni_{75}$ and a relative magnetic permeability of about 1,000.

Figure 4:
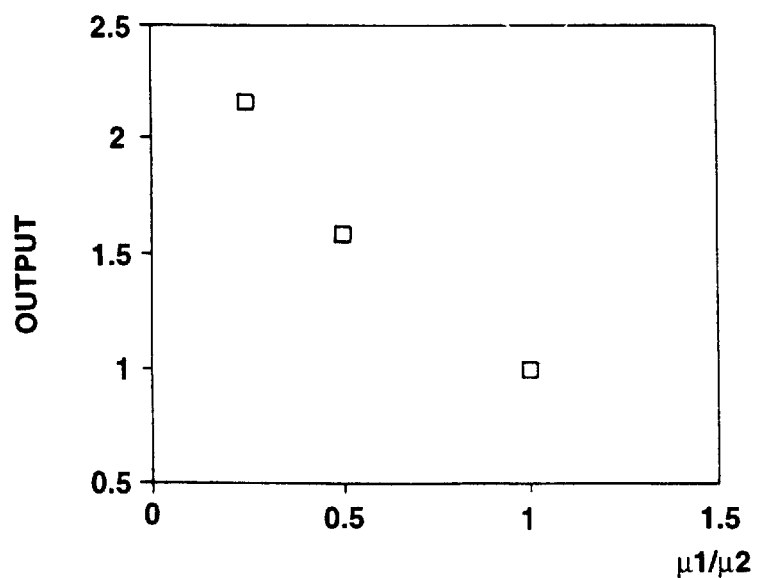
FIG. 4 is a graph showing a relationship between a ratio of a magnetic permeability of a low-permeability magnetic layer to that of a lower or upper magnetic layer and a reproduction output of the magneto-resistance effect element.

FIG. 4 shows the results of simulation tests conducted to examine a relationship between a ratio ($\mu 1/\mu 2$) of a magnetic: permeability $\mu 1$ of the low-permeability magnetic layers 21 and 22 to the magnetic permeability $\mu 2$ of the lower or upper magnetic layers 2 or 3, and a reproduction output of the MR element 1. In FIG. 4, the reproduction output is represented as a relative value assuming that the reproduction output obtained in the case where the ratio $\mu 1/\mu 2$ is 1 is regarded as 1. As is apparently understood from FIG. 4, the reproduction output is enhanced by limiting the magnetic permeability $\mu 1$ of the low-permeability magnetic layers 21 and 22 to a value not more than half of the magnetic permeability $\mu 2$ of the lower or upper magnetic layers 2 or 3.

Further, a protective layer 17 composed of a non-magnetic and non-conductive material such as $Al_2O_3$, $SiO_2$ or the like, is formed as an uppermost layer on the upper magnetic layer 3, whereby the afore-mentioned MR head is completed.

Thus, the MR head according to the preferred embodiment of the present invention has such a structure that the low-permeability magnetic layers 21 and 22 are respectively provided on both surfaces of the lower and upper magnetic layers 2 and 3 which surfaces are opposed to the MR element. Accordingly, a magnetic flux to be absorbed by the lower and upper magnetic layers 2 and 3 is passed through the low-permeability magnetic layers 21 and 22 before reaching the lower and upper magnetic layers 2 and 3. As a result, the quantity of the magnetic flux reaching the lower and upper magnetic layers 2 and 3 is reduced as compared to the conventional MR heads without the low-permeability magnetic layer. In addition, since the magnetic permeability of each of the low-permeability magnetic layers 21 and 22 is adjusted to a level not more than half of the magnetic permeability of each of the lower and upper magnetic layers 2 and 3, it is prevented that inherent functions of the lower and upper magnetic layers 2 and 3, i.e., a function for preventing unnecessary magnetic flux from entering the MR element 1 or a function as a recording pole, are deteriorated.

Thus, the MR head according to the preferred embodiment of the present invention can satisfy two contradictory requirements simultaneously, i.e., not only the quantity of the magnetic flux to be absorbed by the lower and upper magnetic layers 2 and 3 can be reduced so that a magnetic flux-converging efficiency of the MR element 1 is enhanced and the reproduction output from the MR head is increased, but also the inherent functions of the lower and/or upper magnetic layers 2 and 3 can be maintained properly.

In the following, a method of producing the aforementioned MR head is described.

First, the lower magnetic layer 2 composed of a soft magnetic material is formed on the non-magnetic substrate 11.

Successively, by using vacuum thin film formation techniques such as a sputtering method or the like, a low-permeability magnetic layer 21 composed of a magnetic material having a low magnetic permeability not more than half of the magnetic permeability of the lower or upper magnetic layer 2 or 3, such as an Ni—Fe alloy or the like, is formed over the lower magnetic layer 2. Thereafter, the low-permeability magnetic layer 21 is covered with a photo-resist which is formed into a given pattern by a photo-lithographic method. The low-permeability magnetic layer 21 is etched through the photo-resist pattern, so that the lower low-permeability magnetic layer 21 is finally formed only in close proximity to the surface (a) of the MR head along which the magnetic recording medium 20 is slidingly traveled.

Next, the insulating layer 12 composed of $Al_1O_3$ or the like is laminated by a sputtering method or the like in order to form a magnetic gap. An magneto-resistant film composed of an Ni—Fe alloy or the like is then formed over the insulating layer 12 by a sputtering method or the like. The magneto-resistant film is covered with a photo-resist which is then formed into a given pattern by a photo-lithographic technique. Successively, the magneto-resist film is etched through the photo-resist pattern to form the MR element 1 whose longitudinal direction is perpendicular to the surface (a) of the head along which the magnetic recording medium is slidingly traveled.

Next, the insulating layer 13 is formed on the MR element 1 by a sputtering method or the like. The insulating layer 13 is then drilled to form a connecting bore communicating therethrough with a rear end of the MR element 1 where the rear electrode 16b serving for supplying a sense current to the MR element 1 is formed.

Thereafter, a conductor film is deposited by a sputtering method or the like and covered with a photo-resist which is then formed into a given pattern by a photo-lithographic method. The conductor film is then etched through the photo-resist pattern to form the bias conductor 14. The insulating layer 15 is laminated over the rear electrode 16b and the bias conductor 14.

Successively, the insulating layer 15 is drilled to form a connecting bore communicating therethrough with a front end of the MR element where the front electrode 16a serving for supplying a sense current to the MR element 1 is formed. The upper low-permeability magnetic layer 22 is formed on the front electrode 16a by sputtering method, photo-lithographic method, etching method or the like in the same manner as used for the production of the lower low-permeability magnetic layer 21. Over the upper low-permeability magnetic film 22 and the insulating layer 15, there are in turn laminated the upper magnetic layer 3 serving as a magnetically-shielding film, and the protective layer 17, whereby the production of the afore-mentioned MR head is completed.

As described above, in accordance with the present invention, it becomes possible to produce a magneto-resistance effect-type magnetic head capable of increasing a quantity of magnetic flux passing across an effective magneto-sensitive zone of a magneto-resistance effect element to generate a high reproduction output while maintaining its inherent functions as a means for preventing unnecessary magnetic flux from entering the MR element or as a recording pole.

What is claimed is:

1. A magneto-resistance effect-type magnetic head for reproducing signals from a magnetic recording medium, comprising:

a magneto-resistance effect element comprising a permalloy layer;

upper and lower magnetic layers comprising permalloy layers between which said magneto-resistance effect element is interposed; and a low-permeability magnetic layer comprising a permalloy layer provided on at least one of surfaces of said upper and lower magnetic layers which surfaces are opposed to said magneto-resistance effect element, said low-permeability magnetic layer having a magnetic permeability not more than half of a magnetic permeability of said upper of lower magnetic layer.

2. A magneto-resistance effect-type magnetic head as claimed in claim 1, wherein a longitudinal direction of said magneto-resistance effect element is approximately perpendicular to the direction of traveling of said magnetic recording medium.

3. A magneto-resistance effect-type magnetic head as claimed in claim 2, wherein said low-permeability magnetic layer is located only in close proximity to a surface of the head along which said magnetic recording medium is slidingly traveled.

4. A magneto-resistance effect-type magnetic head as claimed in claim 1, wherein said low-permeability magnetic layer has a length approximately identical to a gap depth of the head.

5. A magneto-resistance effect-type magnetic head as claimed in claim 1, wherein said low-permeability magnetic layer has a thickness not more than a reproduction gap length of the head.

6. A magneto-resistance effect-type magnetic head as claimed in claim 1, wherein said low-permeability magnetic layer and said upper and lower magnetic layers are composed of permalloy (Ni—Fe), and an iron content of said low-permeability magnetic layer is higher than that of each of said upper and lower magnetic layers.

* * * * *